United States Patent
Sui et al.

(10) Patent No.: US 11,977,922 B2
(45) Date of Patent: May 7, 2024

(54) RESOURCE REUSE FOR PIPELINE WORKLOADS

(71) Applicant: International Business Machines Corporation, Armonk, NY (US)

(72) Inventors: Guang Han Sui, Beijing (CN); Jin Chi JC He, Xi'an (CN); Peng Hui Jiang, Beijing (CN); Jun Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 17/449,534

(22) Filed: Sep. 30, 2021

(65) Prior Publication Data
US 2023/0102645 A1 Mar. 30, 2023

(51) Int. Cl.
G06F 9/50 (2006.01)
G06F 9/38 (2018.01)

(52) U.S. Cl.
CPC ............... *G06F 9/505* (2013.01); *G06F 9/38* (2013.01)

(58) Field of Classification Search
None
See application file for complete search history.

(56) References Cited

U.S. PATENT DOCUMENTS

| | | | |
|---|---|---|---|
| 8,914,515 B2 | 12/2014 | Alapati et al. | |
| 9,842,428 B2 | 12/2017 | Wang | |
| 10,031,819 B2* | 7/2018 | Banerjee | G06F 3/065 |
| 10,135,709 B1 | 11/2018 | Segel et al. | |
| 10,360,410 B2* | 7/2019 | Cahana | G06F 21/53 |
| 10,572,226 B2* | 2/2020 | Biskup | G06F 8/60 |
| 10,884,636 B1 | 1/2021 | Abrol et al. | |
| 10,969,988 B2* | 4/2021 | Tarasov | G06F 3/061 |
| 11,579,908 B2* | 2/2023 | Ghag | G06F 9/5077 |
| 11,689,613 B2* | 6/2023 | Dailianas | G06F 9/45558 709/226 |
| 11,886,921 B2* | 1/2024 | Regge | G06F 9/5055 |

(Continued)

FOREIGN PATENT DOCUMENTS

CN 108920153 A 11/2018

OTHER PUBLICATIONS

Suo et al. "Tackling Cold Start of Serverless Applications by Efficient and Adaptive Container Runtime Reusing", 2021 IEEE, pp. 433-443.*

(Continued)

*Primary Examiner* — Van H Nguyen
(74) *Attorney, Agent, or Firm* — Yee & Associates, P.C.

(57) ABSTRACT

Reusing containers is provided. It is communicated to a pipeline workload manager that a particular container has finished running a step of a pipeline workload using an agent daemon of the particular container. Pipeline workload information corresponding to the pipeline workload is checked using the pipeline workload manager to determine whether the particular container can be reused to run a particular step in a different pipeline workload. The particular container is provided to be reused to run the particular step in the different pipeline workload without having to perform a prepare container environment sub-step of that particular step based on determining that the particular container can be reused to run that particular step in the different pipeline workload according to the pipeline workload information.

17 Claims, 9 Drawing Sheets

(56) References Cited

U.S. PATENT DOCUMENTS

| | | |
|---|---|---|
| 2018/0083845 A1 | 3/2018 | Chan et al. |
| 2020/0036596 A1 | 1/2020 | Panda et al. |
| 2020/0186422 A1 | 6/2020 | Fildebrandt et al. |
| 2020/0356397 A1 | 11/2020 | Kumatagi et al. |
| 2021/0117243 A1 | 4/2021 | Ghafourifar |

OTHER PUBLICATIONS

PCT International Search Report and Written Opinion, dated Nov. 29, 2022, regarding Application No. PCT/CN2022/116725, 9 pages.
Anonymous, "System and Method to Efficiently Profile the Pods in a Kubernetes Cluster," An IP.com Prior Art Database Technical Disclosure, IPCOM000260761D, Dec. 19, 2019, 7 pages.

\* cited by examiner

| | STEP SOURCE | PRIORITY | SUBMISSION TIME | SUBMITTER NAME | |
|---|---|---|---|---|---|
| STEP X | FROM PIPELINE WORKLOAD A | 1 | 9:00 AM | TOM | ∘ ∘ ∘ |
| STEP Y | FROM PIPELINE WORKLOAD B | 1 | 9:30 AM | TOM | ∘ ∘ ∘ |
| STEP Z | FROM PIPELINE WORKLOAD B | 2 | 11:00 AM | JACK | ∘ ∘ ∘ |

STEP SELECTION TABLE 600

604, 606, 608, 610

STEPS 602

FIG. 6

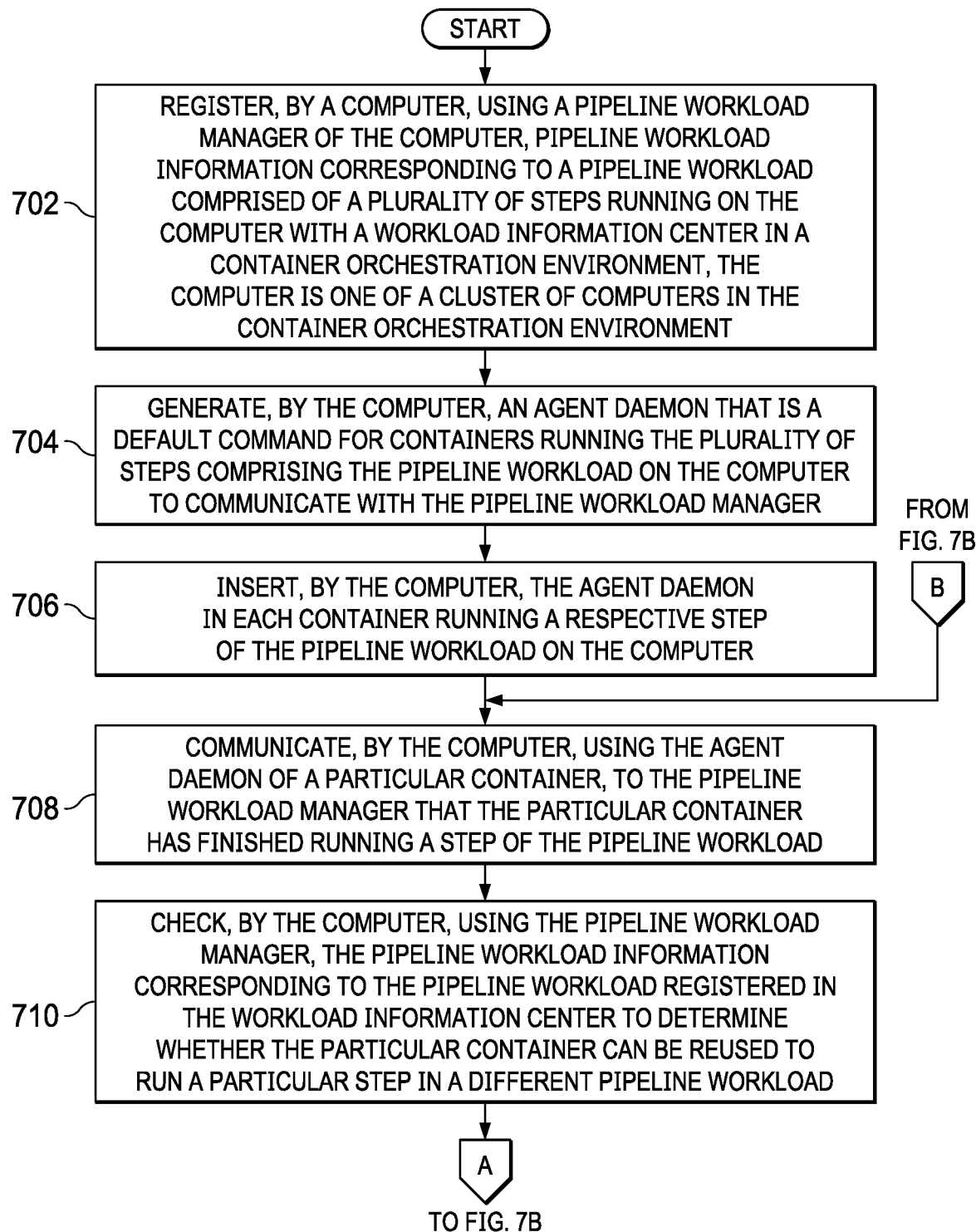

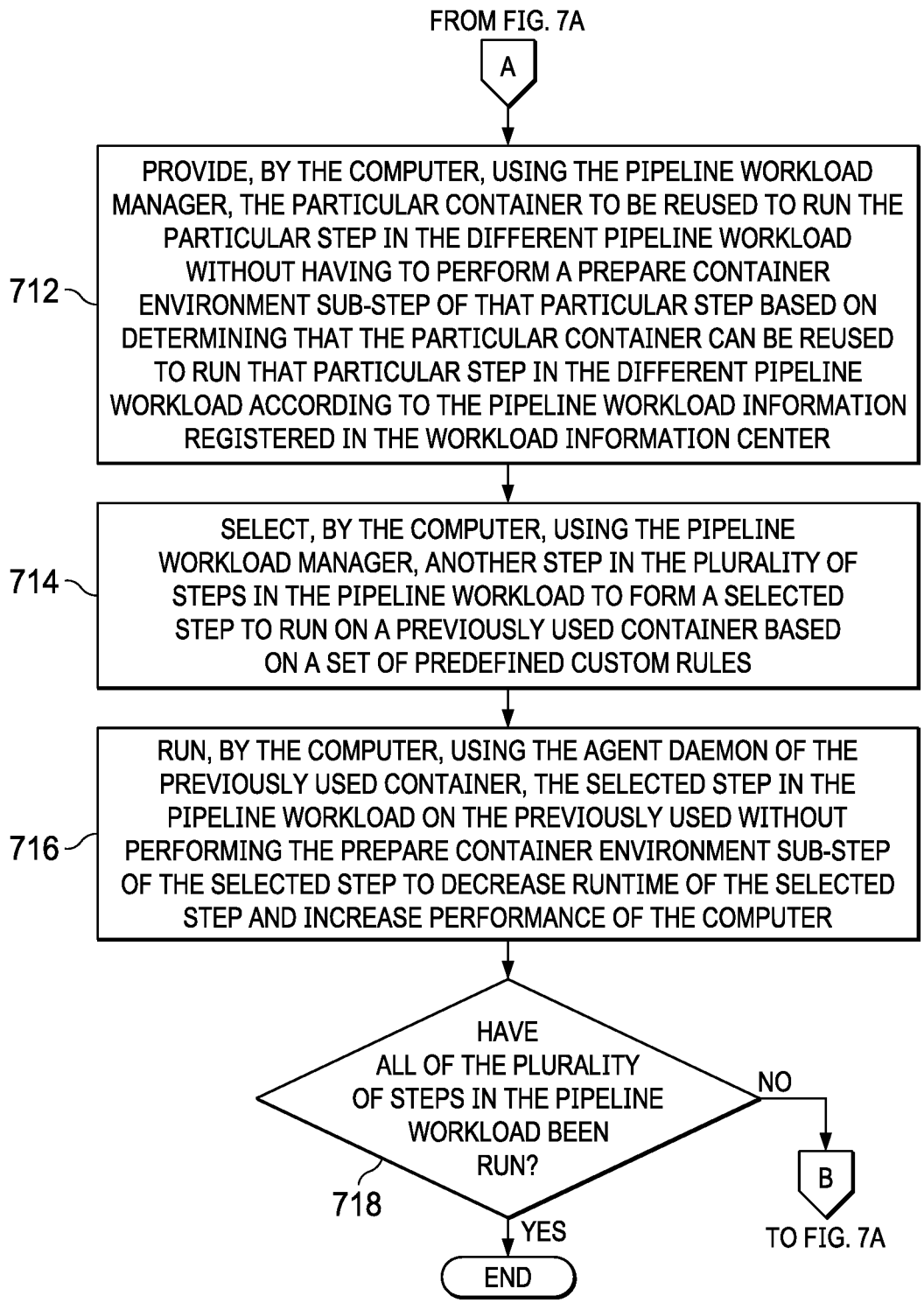

RESOURCE REUSE FOR PIPELINE WORKLOADS

BACKGROUND

1. Field

The disclosure relates generally to container orchestration environments and more specifically to optimizing resources for a pipeline workload comprised of a plurality of steps in a container orchestration environment by reusing a container, which finished running a step of the pipeline workload on a host node, to run a particular step in a different pipeline workload.

2. Description of the Related Art

A container orchestration environment, such as, for example, Kubernetes® (a registered trademark of the Linux Foundation of San Francisco, California), provides a platform for automating deployment, scaling, and operations of containers across clusters of host nodes. A host node is a machine, either physical or virtual, where containers (i.e., application workload) are deployed. A pod is a group of one or more containers, with shared storage and network resources, and a specification for how to run the containers. A pod's contents are always co-located and co-scheduled and run in a shared context. The host node hosts the pods that are the components of the application workload.

A scheduler selects which host node an unscheduled pod runs on, based on resource availability of respective host nodes. A pod is the basic unit managed by the scheduler. The scheduler tracks resource utilization on each host node to ensure that workload is not scheduled in excess of available resources.

One current solution optimizes utilization of hardware resources by automatically assessing and allocating virtualized resources (e.g., central processing unit and graphics processing unit resources) by building a watcher to monitor the workflow queue and placing the workflows associated with the workload on the workflow queue to make full use of resources. Another current solution presents workload performance in a storage system, predicts performance load on the storage system that would result from implementing a potential change, and displays predicted characteristics of one or more workloads executing on the storage system. Yet another current solution computes and continuously refines pod size for all pods of an application workload based on actual application usage patterns to deliver expected performance on an estimated workload. However, none of these current solutions optimize resources for an application workload comprised of a plurality of steps that is used for artificial intelligence processing on a cluster of host nodes.

SUMMARY

According to one illustrative embodiment, a computer-implemented method for reusing containers is provided. A computer, using an agent daemon of a particular container, communicates to a pipeline workload manager of the computer that the particular container has finished running a step of a pipeline workload. The computer, using the pipeline workload manager, checks pipeline workload information corresponding to the pipeline workload to determine whether the particular container can be reused to run a particular step in a different pipeline workload. The computer, using the pipeline workload manager, provides the particular container to be reused to run the particular step in the different pipeline workload without having to perform a prepare container environment sub-step of that particular step based on determining that the particular container can be reused to run that particular step in the different pipeline workload according to the pipeline workload information. According to other illustrative embodiments, a computer system and computer program product for reusing containers are provided. As a result, the illustrative embodiments provide a technical effect and practical application in the field of container orchestration by reusing containers among pipeline workloads to decrease cost by eliminating a need to perform the prepare container environment sub-step for each reused container, which decreases overall container execution time and, thereby, increases performance in the container orchestration environment.

The illustrative embodiments also optionally select, using the pipeline workload manager, another step in a plurality of steps in the pipeline workload to form a selected step to run on a previously used container based on a set of rules and run, using the agent daemon of the previously used container, the selected step in the pipeline workload on the previously used container without performing the prepare container environment sub-step of the selected step to decrease runtime of the selected step and increase performance of the computer. As a result, the illustrative embodiments can save, for example, 30% or more in container execution time by not performing the prepare container environment sub-step for reused containers in pipeline workloads. In other words, illustrative embodiments can finish a pipeline workload using, for example, 70% or less of the normal container execution time, which decreases cost and increases performance of the container orchestration environment.

BRIEF DESCRIPTION OF THE DRAWINGS

FIG. 6 is a diagram illustrating an example of a step selections table in accordance with an illustrative embodiment;

FIGS. 7A-7B are a flowchart illustrating a process for running steps of pipeline workloads on previously used containers to decrease step execution time in accordance with an illustrative embodiment.

DETAILED DESCRIPTION

Figure 1:
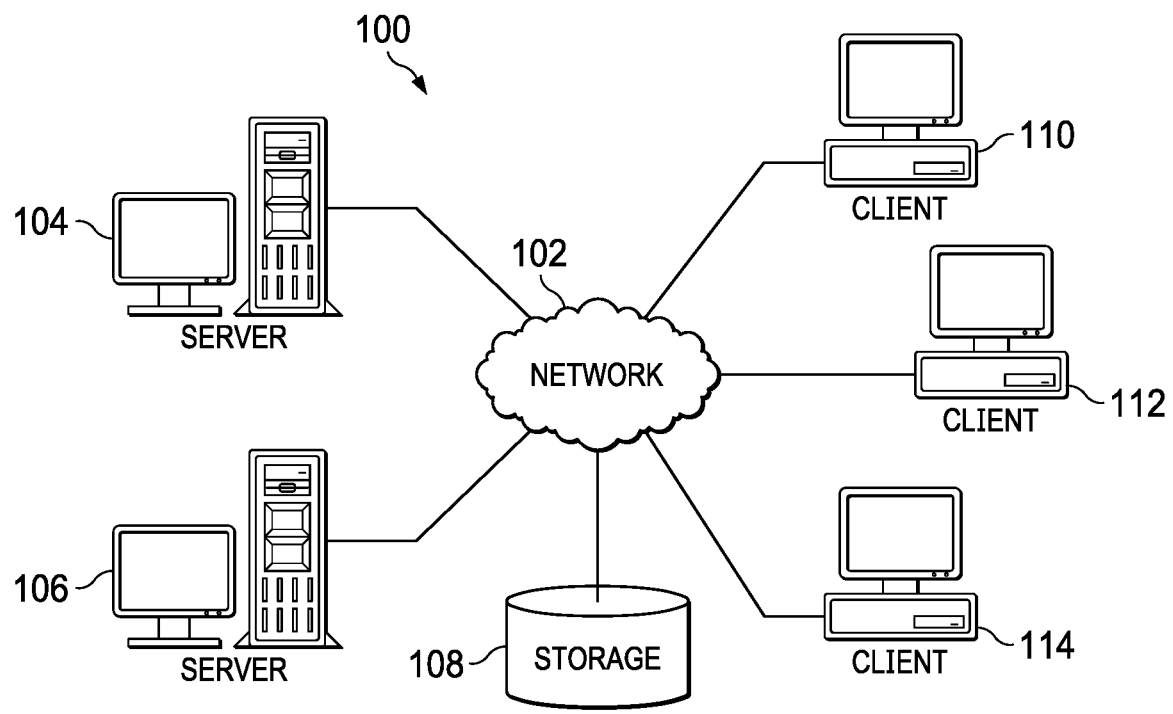
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media)

having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
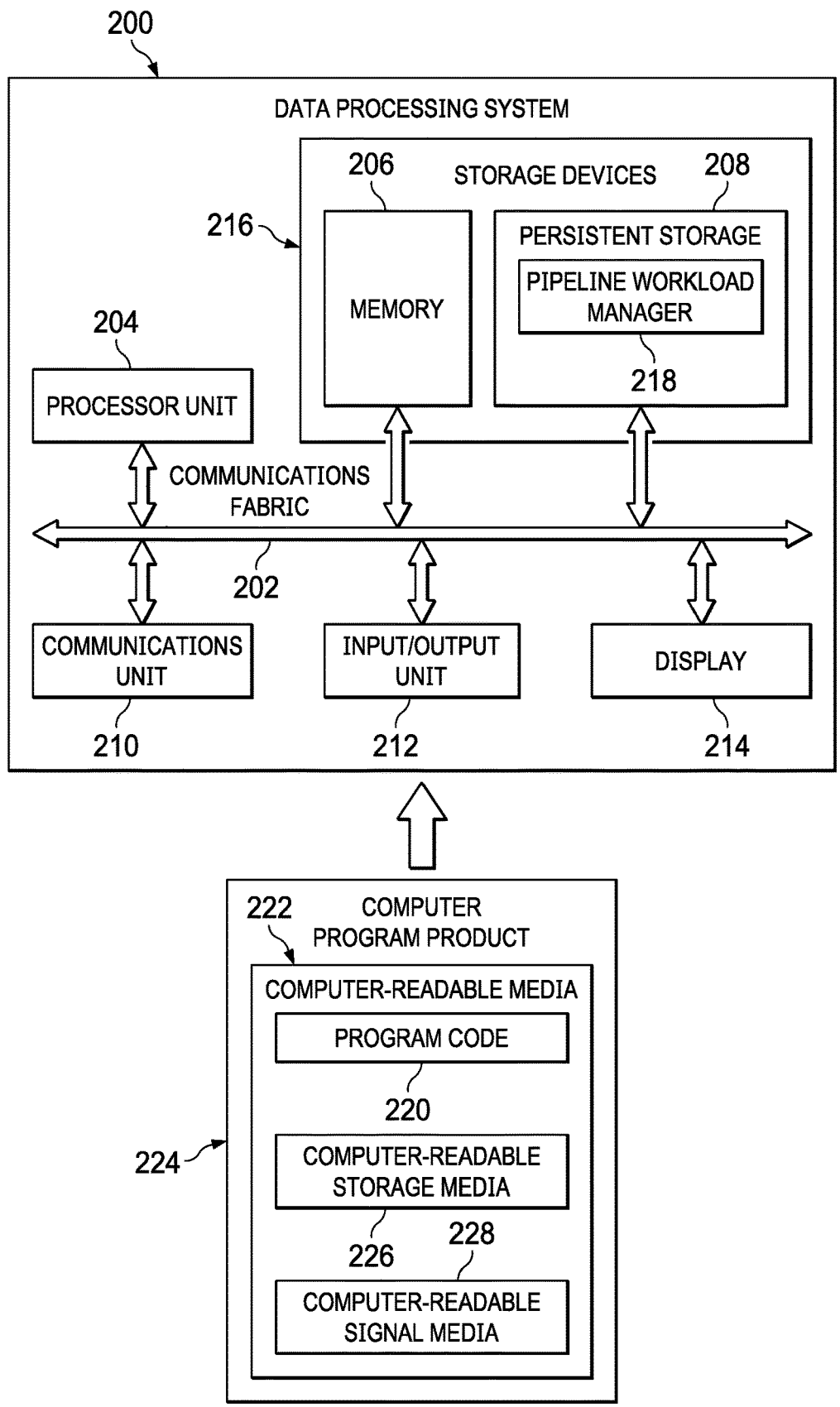
FIG. 2 is a diagram of a data processing system in which illustrative embodiments may be implemented.
Figure 3:
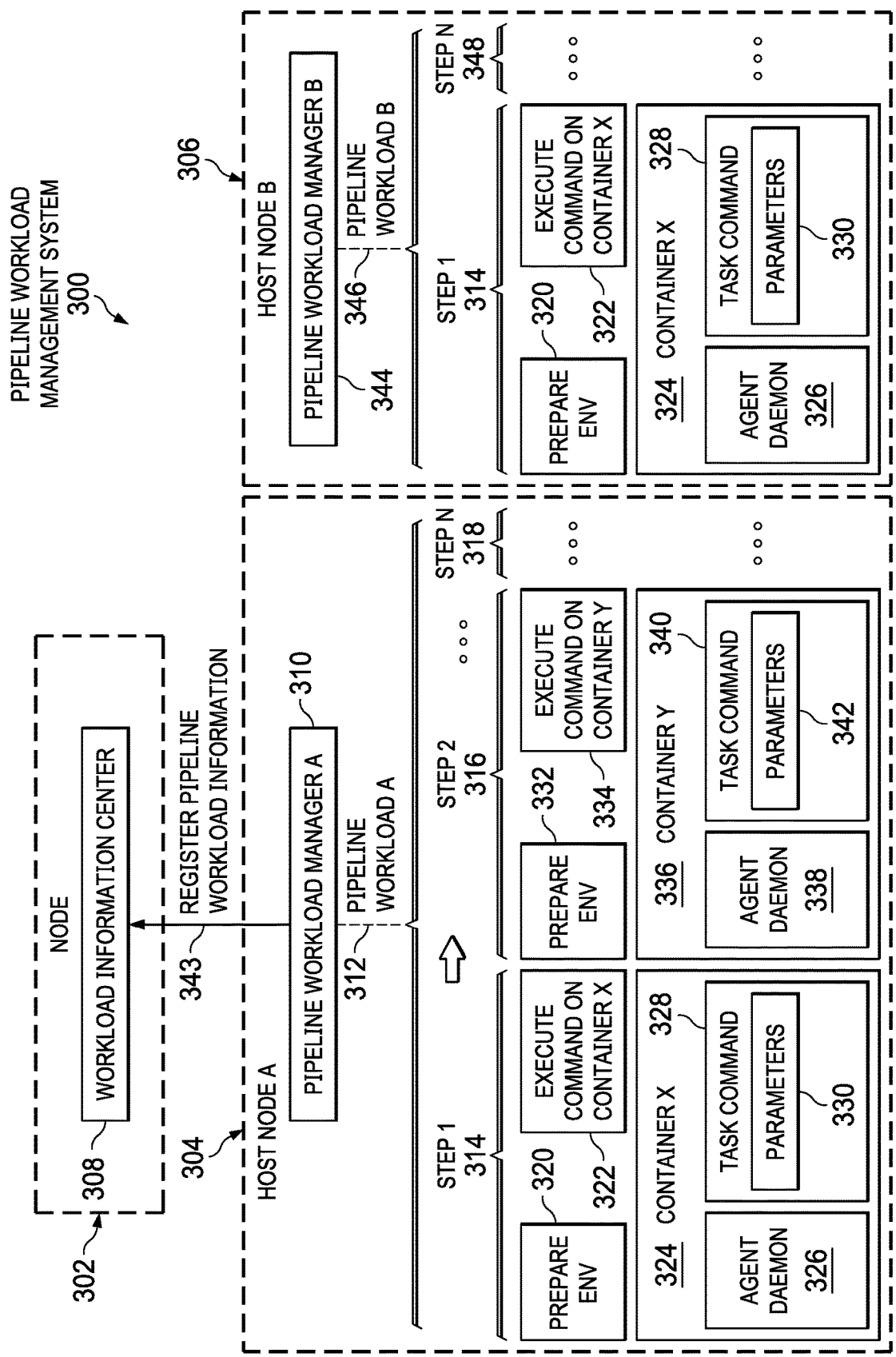
FIG. 3 is a diagram illustrating an example of a pipeline workload management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. In this example, network data processing system 100 represents a container orchestration environment, such as Kubernetes. However, it should be understood that Kubernetes is intended as an example architecture only and not as a limitation on illustrative embodiments. In other words, illustrative embodiments may utilize any type of container orchestration platform, architecture, infrastructure, or environment that provides automated deployment, scaling, and operations of containers across host nodes.

Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent multiple servers in one or more data centers. Alternatively, server 104 and server 106 may each represent multiple computing nodes in one or more cloud environments.

In addition, server 104 and server 106 may represent a cluster of physical and virtual host nodes in the container orchestration environment that runs pipeline application workloads for client devices. A pipeline application workload may include any type of workload, such as, for example, artificial intelligence processing, natural language processing, image processing, computer vision, scientific calculations, forecasts, predictions, recommendations, data processing, transaction processing, and the like. Further, a pipeline application workload is comprised of a plurality of steps. Furthermore, server 104 and server 106 can optimize resource utilization for a pipeline workload running on server 104 or server 106 in the container orchestration environment. For example, server 104 can optimize resource utilization for a pipeline workload by reusing a container that finished running a step of the pipeline workload on server 104 to run a particular step (e.g., the same step or a different step) in a different pipeline workload on server 104 or server 106. While the term container is generally used in the Kubernetes paradigm, the term as used herein is not limited to that environment but rather refers to any type of container where pipeline application workloads are deployed and hold the running applications, libraries, and their dependencies.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart vehicles, smart appliances, gaming devices, virtual reality devices, and the like, with wire or wireless communication links to network 102. Users of clients 110, 112, and 114 may utilize clients 110, 112, and 114 to submit requests to perform pipeline workloads on server 104 and server 106.

Storage 108 is a network storage device capable of storing any type of data in a structured format or an unstructured format. In addition, storage 108 may represent a plurality of network storage devices. Further, storage 108 may be a workload information center that stores, for example, identifiers and network addresses for a plurality of servers (e.g., host nodes), identifiers for a plurality of pipeline workload managers located on the plurality of servers, identifiers and network addresses for a plurality of client devices, pipeline workload information corresponding to a plurality of different pipeline workloads, identifiers for steps that comprise the plurality of pipeline workloads, identifiers for a plurality of containers that run the steps, and the like. Furthermore, storage 108 may store other types of data such as authentication or credential data that may include usernames, passwords, and the like associated with client device users and container orchestration environment administrators, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the container sharing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores pipeline workload manager 218. However, it should be noted that even though pipeline workload manager 218 is illustrated as residing in persistent storage 208, in an alternative illustrative embodiment, pipeline workload manager 218 may be a separate component of data processing system 200. For example, pipeline workload manager 218 may be a hardware component coupled to communication fabric 202 or a combination of hardware and software components.

Pipeline workload manager 218 controls the process of optimizing resources for a pipeline workload comprised of a plurality of in a container orchestration environment by reusing a container, which finished running a step of the pipeline workload on data processing system 200, to run the same step or a different step in a different pipeline workload on data processing system 200 or a different host node in the container orchestration environment based on pipeline workload information registered with an external workload information center. The external workload information center may be, for example, storage 108 in FIG. 1. As a result, data processing system 200 operates as a special purpose computer system in which pipeline workload manager 218 in data processing system 200 enables sharing of containers to run same or different steps among pipeline workloads to reduce cost and increase performance in the container orchestration environment. In particular, pipeline workload manager 218 transforms data processing system 200 into a special purpose computer system as compared to currently available general computer systems that do not have pipeline workload manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Pipeline workload management is widely used for data processing, such as, for example, artificial intelligence processing. An entire application workload is divided into multiple steps and these multiple steps are executed in a sequence to obtain a result. Each respective step represents a task to be performed for the application workload and execution of a sequence of tasks comprises the entire application workload.

Each respective step in the application workload runs a task command in a container on a host node in a cluster of a container orchestration environment. In addition, each respective step comprises two sub-steps. The two sub-steps include a "prepare environment" sub-step and an "execute command" sub-step. An agent daemon located in a respective container running on a host node controls the logic.

The agent daemon uses the prepare environment sub-step to prepare the environment for the container to run the task command. The prepare environment sub-step includes actions such as download container image, check hardware, check quality of service, and the like and typically needs 3-5 seconds to complete. After the prepare environment sub-step for the container completes, the agent daemon uses the execute command sub-step to run a task command of the application workload in the container. The execute command sub-step includes actions such as start container, run task command, output result, and the like and usually needs 1-20 seconds to complete, with an average duration of 10 seconds. Thus, the duration of the prepare container environment sub-step can comprise 30% or more of the total execution time of the entire step. Consequently, the cost of performing the prepare container environment sub-step for millions of steps in pipeline workloads is substantial in terms of overall execution time and system performance. As a result, a need exists to decrease the time needed to execute steps in pipeline workloads.

Illustrative embodiments optimize resources for a pipeline application workload on a cluster of host nodes in a container orchestration environment by reusing containers among pipeline workloads on host nodes in the cluster. Reusing containers among pipeline workloads decreases cost by eliminating a need to perform the prepare container environment sub-step for each reused container, which decreases overall container execution time and, thereby, increases host node performance in the cluster.

Illustrative embodiments provide a workload information center in the container orchestration environment. The workload information center stores container information and pipeline workload information corresponding to the different pipeline workloads executing in the container orchestration environment. The workload information center may be located on, for example, a storage unit node, a database server node, a controller node, a host node, a compute node, or the like, in the container orchestration environment. Illustrative embodiments also provide a plurality of pipeline workload managers in the container orchestration environment. Each respective pipeline workload manager may be located on, for example, a host node, a compute node, or the like, which executes steps of the application workload in containers. Further, each respective pipeline workload manager registers pipeline workload information, which includes, for example, a pipeline workload identifier, task commands, parameters of the task commands, identifiers corresponding to a set of pipeline workload managers that can use or reuse a particular container in a pipeline workload, container identifiers, step identifiers corresponding to the container identifiers, and the like, for each respective pipeline workload and container registered in the workload information center.

Illustrative embodiments can register pipeline workload information with the workload information center for a lower priority pipeline workload that does not need to run immediately based on, for example, custom rules, such as a higher priority workload is to run before the lower priority workload. As an illustrative example, pipeline workload manager B registers its pipeline workload information (e.g., step 1 corresponding to the pipeline workload B needs to run on container X) with the workload information center. When a step running on any container X finishes in another pipeline workload, pipeline workload manager B can reuse that container X to run step 1 and save the cost of performing the prepare container environment sub-step for container X.

Illustrative embodiments also generate an agent daemon and insert the agent daemon into each respective container running on host nodes of the container orchestration environment. Illustrative embodiments make the agent daemon the default command for each respective container. Further, the agent daemon in a particular container communicates with the pipeline workload manager that corresponds with that particular container. As an illustrative example, once the agent daemon starts on a container as the default command for that container, the agent daemon communicates with the corresponding pipeline workload manager to obtain from the workload information center the pipeline workload information (e.g., task command and its parameters) corresponding to a pipeline workload that a user (e.g., customer, client, tenant, or the like) wants to run on the container orchestration environment. Thus, illustrative embodiments utilizing the agent daemon can support custom task commands for a container.

The pipeline workload manager corresponding to the container checks obtained pipeline workload information from the workload information center to determine whether the container can be reused for a particular step in a particular pipeline workload on the same or a different host node in the cluster in response to the container finishing running a step. The pipeline workload manager provides the container to be reused by that particular step in the particular pipeline workload based on the obtained pipeline workload information from the workload information center. Furthermore, the pipeline workload manager can select a step in a plurality of steps corresponding to its pipeline workload, which is registered with the workload information center, to be run first on a reused container based on a set of predefined custom rules.

As a result, illustrative embodiments can save, for example, 30% or more in container execution time by not performing the prepare container environment sub-step for reused containers in pipeline workloads. In other words, illustrative embodiments can finish a pipeline workload using, for example, 70% or less of the normal container execution time, which decreases cost and increases performance of the container orchestration environment.

Thus, illustrative embodiments provide one or more technical solutions that overcome a technical problem with decreasing container execution time to increase performance in a container orchestration environment. As a result, these one or more technical solutions provide a technical effect and practical application in the field of container orchestration environments.

With reference now to FIG. 3, a diagram illustrating an example of a pipeline workload management system is depicted in accordance with an illustrative embodiment. Pipeline workload management system 300 may be implemented in a network of data processing systems, such as network data processing system 100 in FIG. 1. Pipeline workload management system 300 is a system of hardware and software components for optimizing resources for a pipeline workload comprised of a plurality of steps by reusing a container, which finished running a step of the pipeline workload, to run a particular step (e.g., same or different step) in a different pipeline workload.

In this example, pipeline workload management system 300 includes node 302, host node A 304, and host node B 306. However, it should be noted that pipeline workload management system 300 is intended as an example only and not as a limitation on illustrative embodiments. In other words, pipeline workload management system 300 may include any number of nodes and components not shown.

Node 302 may be, for example, a storage node such as storage 108 in FIG. 1. Alternatively, node 302 may be a server node, database node, controller node, or the like. Node 302 includes workload information center 308. Workload information center 308 contains registered information corresponding to a set of pipeline workloads on one or more host clusters.

In this example, host node A 304 and host node B 306 comprise a cluster of host nodes in the container orchestration environment. However, it should be noted that the container orchestration environment may include any number of host nodes and clusters. Host node A 304 includes pipeline workload manager A 310, such as, for example, pipeline workload manager 218 in FIG. 2. Also, host node A 304 performs pipeline workload A 312. Pipeline workload A 312 includes step 1 314, step 2 316, to step "N" 318. Step 1 314 is comprised of prepare environment sub-step 320 and execute command sub-step 322. Similarly, step 2 316 is comprised of prepare environment sub-step 332 and execute command sub-step 334. It should be noted that each respective step in pipeline workload A 312 includes a prepare environment sub-step and an execute command sub-step.

Pipeline workload manager A 310 runs step 1 314 on container X 324 using agent daemon 326, which is a default command of container X 324. Task command 328 represents a task, job, action, or the like that is executed to produce a result for step 1 314 in response to performing execute command sub-step 322. Task command 328 includes parameters 330. Parameters 330 represent a set of constraints corresponding to task command 328. Similarly, pipeline workload manager A 310 runs step 2 316 on container Y 336 using agent daemon 338, which is a default command of container Y 336. Task command 340 represents the task, job, action, or the like that is executed to produce a result for step 2 316 in response to performing execute command sub-step 334. Task command 340 includes parameters 342. Parameters 342 represent a set of constraints corresponding to task command 340. At 343, pipeline workload manager A 310 registers pipeline workload information (e.g., steps, containers, task commands, parameters, and the like) corresponding to pipeline workload A 312 with workload information center 308.

Host node B 306 includes pipeline workload manager B 344. Also, host node B 306 performs pipeline workload B 346, which may be the same pipeline workload as pipeline workload A 312 or may be a different pipeline workload. Pipeline workload B 346 includes step 1 314 to step "N" 348. It should be noted that step 1 314 of pipeline workload B 346 is the same as step 1 314 in pipeline workload A 312. As a result, step 1 314 of pipeline workload B 346 is also comprised of prepare environment sub-step 320 and execute command sub-step 322. Thus, when step 1 314 of pipeline workload A 312 finishes running on container X 324 of host node A 304, pipeline workload manager A 310 can share container X 324 with host node B 306 to be reused to run step 1 314 of pipeline workload B 346 without having to perform prepare environment sub-step 320 in host node B 306.

Figure 4:
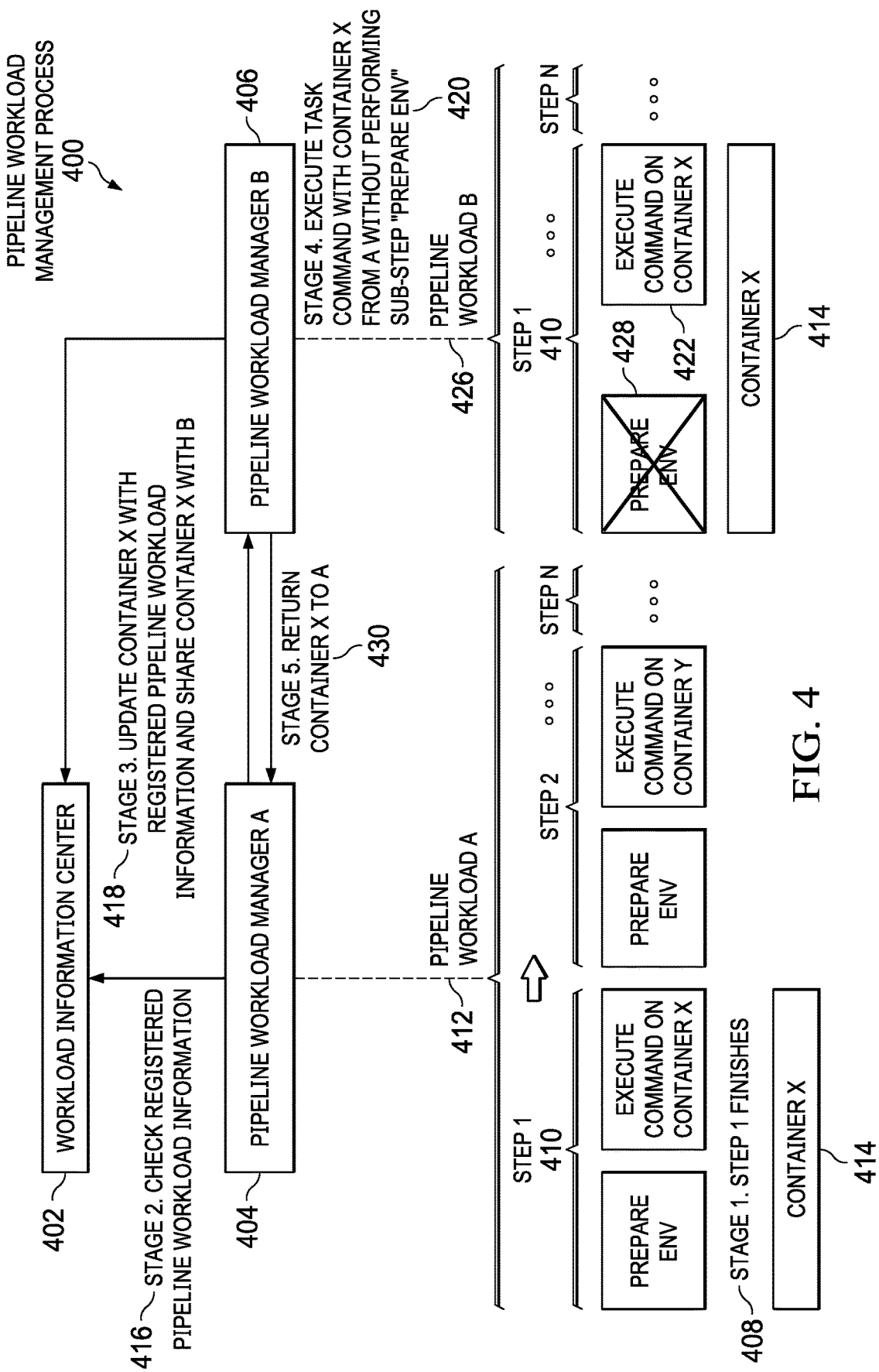
FIG. 4 is a diagram illustrating an example of a pipeline workload management process in accordance with an illustrative embodiment.

With reference now to FIG. 4, a diagram illustrating an example of a pipeline workload management process is depicted in accordance with an illustrative embodiment. Pipeline workload management process 400 may be implemented in a pipeline workload management system, such as, for example, pipeline workload management system 300 in FIG. 3.

In this example, pipeline workload management process 400 includes workload information center 402, pipeline workload manager A 404, and pipeline workload manager B 406, such as, for example, workload information center 308, pipeline workload manager A 310, and pipeline workload manager B 344 in FIG. 3. At stage 1 408, step 1 410 of pipeline workload A 412 finishes running on container X 414. Step 1 410, pipeline workload A 412, and container X 414 may be, for example, step 1 314, pipeline workload A 312, and container X 324 in FIG. 3.

At stage 2 416, pipeline workload manager A 404 checks registered pipeline information in workload information center 402. At stage 3 418, pipeline workload manager A 404 updates container X 414 with the registered pipeline information and shares container X 414 with pipeline workload manager B 406. At stage 4 420, pipeline workload manager B 406 performs execute command sub-step 422 of step 1 410 in pipeline workload B 426 to execute a task command in container X 414, which was shared by pipeline workload manager A 404 with pipeline workload manager B 406, without performing prepare environment sub-step 428 of step 1 410. At stage 5 430, pipeline workload manager B 406 returns container X 414 to pipeline workload manager A 404 after step 1 410 of pipeline workload B 426 finishes running.

Thus, when a container finishes running a step of a pipeline workload, the pipeline workload manager corresponding to the container checks obtained pipeline workload information from the workload information center to determine whether that container can be reused for a particular step (e.g., the same step or a different step) in a different pipeline workload. For example, when a task command for a step finishes running in a container, the pipeline workload manager checks registered pipeline workload information in the workload information center for next actions. For example, if a container cannot be reused based on the registered pipeline workload information, then the container finishes executing that step normally and exits. If the container can be reused by that particular step in another pipeline workload and the container does not need to be restarted, then the current pipeline workload manager shares that container and its pipeline workload information (e.g., task command and its parameters) with the target pipeline workload manager. The target pipeline workload manager sends the task command and its parameters to the container to run the task command on that container. If the container can be reused by another pipeline workload and the container needs to be restarted, then the current pipeline workload manager restarts the container with a restart command, such as, for example, command restart {container id}, and shares the restarted container and its pipeline workload information with the target pipeline workload manager.

Figure 5:
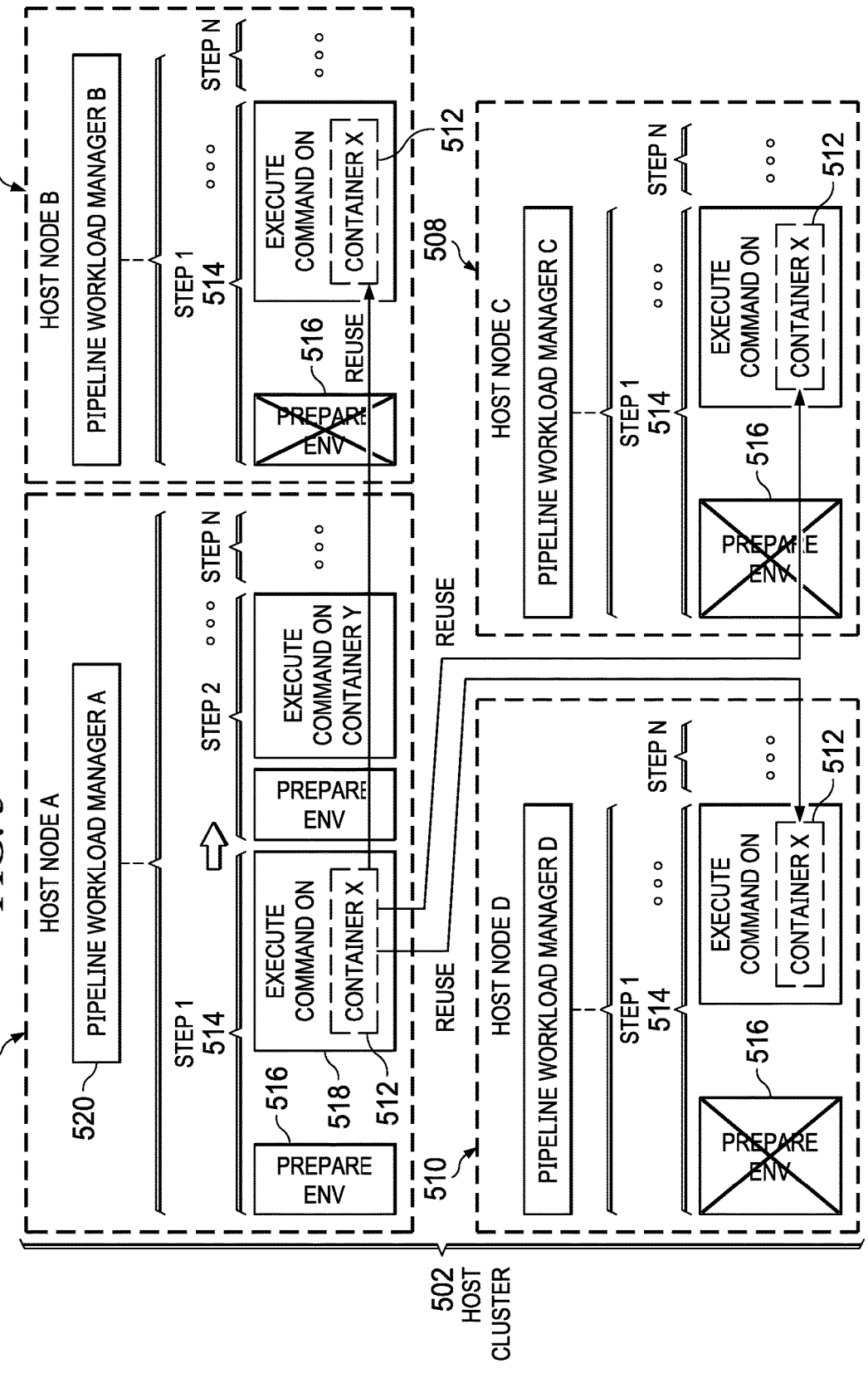
FIG. 5 is a diagram illustrating an example of a container sharing at host cluster level process in accordance with an illustrative embodiment.

With reference now to FIG. 5, a diagram illustrating an example of a container sharing at host cluster level process is depicted in accordance with an illustrative embodiment. Container sharing at host cluster level process 500 may be implemented in a network of data processing systems, such as, for example, network data processing system 100 in FIG. 1.

Container sharing at host cluster level process 500 includes host cluster 502. Host cluster 502 represents a cluster of host nodes, such as, for example, server 104 and server 106 in FIG. 1, which perform pipeline workloads. In this example, host cluster 502 includes host node A 504, host node B 506, host node C 508, and host node D 510. However, it should be noted that host cluster 502 is intended as an example only and not as a limitation on illustrative embodiments. In other words, host cluster 502 may include more or fewer host nodes than shown.

It should be noted that a container can be reused by multiple steps in the same or different pipeline workload on same or different host nodes. In other words, the container can be reused many times before it exits. At the host cluster level, the same step can run on the same reused container among the cluster of host nodes to save the cost of performing the prepare container environment sub-step for that same step each time that step is run.

For example, container X 512 runs step 1 514 on host node A 504 after performing both prepare environment sub-step 516 and execute command sub-step 518. After container X 512 finishes running step 1 514, pipeline workload manager 520 of host node A 504 shares container X 512 with host node B 506 to be reused to execute step 1 514 without performing prepare environment sub-step 516 of step 1 514. It should be noted that host node B 506 may be performing the same or a different pipeline workload, which includes step 1 514, as host node A 504. Similarly, pipeline workload manager 520 of host node A 504 shares container X 512 with host node C 508 to be reused to execute step 1 514 in a pipeline workload of host node C 508 without performing prepare environment sub-step 516 of step 1 514; and shares container X 512 with host node D 510 to be reused to execute step 1 514 in a pipeline workload of host node D 510 without performing prepare environment sub-step 516 of step 1 514. As a result, performance of host cluster 502 is increased by saving the processing cost of not performing prepare environment sub-step 516 in multiple host nodes.

With reference now to FIG. 6, a diagram illustrating an example of a step selections table is depicted in accordance with an illustrative embodiment. Step selection table 600 may be implemented in a pipeline workload manager, such as, for example, pipeline workload manager 310 in FIG. 3.

In this example, step selection table 600 includes steps 602, step source 604, priority 606, submission time 608, and submitter name 610. Steps 602 identify steps of a pipeline workload. Step source 604 identifies the particular pipeline workload that corresponds to each respective step in steps 602. Priority 606 identifies a priority level that corresponds to each respective step in steps 602. Submission time 608 identifies a specific time when each respective step in steps 602 was submitted. Submitter name 610 identifies a specific person who submitted a respective step in steps 602.

The pipeline workload manager utilizes step selection table 600 to select a particular step in a pipeline workload to run on a container of a host node based on a predefined set of custom rules created by a user, such as, for example, the person who requested performance of the pipeline workload. For example, when multiple steps can run on the same container, the pipeline workload manager can select which step will run first based on the user-defined set of custom rules (e.g., select step by priority, submission time, submitter name, or the like). The pipeline workload manager, using an agent daemon inserted in the container, executes the selected step first on that particular container. The agent daemon inserted in the container may be, for example, agent daemon 326 inserted in container X 324 in FIG. 3.

In this example, step X from pipeline workload A has a priority of 1 and was submitted at 9:00 AM by Tom; step Y from pipeline workload B has a priority of 1 and was submitted at 9:30 AM by Tom; and step Z from pipeline workload B has a priority of 2 and was submitted at 11:00 AM by Jack. If a user's defined rule indicates priority first, then the pipeline workload manager selects step Z to run first on the container because step Z has a priority of 2, which is a higher priority than 1 in this example. Similarly, if the user's defined rule indicates submission time first, then the pipeline workload manager selects step X to run first on the container because step X has an earlier submission time of 9:00 AM, as opposed to step Y with a submission time of 9:30 AM and step Z with a submission time of 11:00 AM.

With reference now to FIGS. 7A-7B, a flowchart illustrating a process for running steps of pipeline workloads on previously used containers to decrease step execution time is shown in accordance with an illustrative embodiment. The process shown in FIGS. 7A-7B may be implemented in a computer, such as, for example, server 104 in FIG. 1 or data processing system 200 in FIG. 2.

The process begins when the computer, using a pipeline workload manager of the computer, registers pipeline workload information corresponding to a pipeline workload comprised of a plurality of steps running on the computer with a workload information center in a container orchestration environment, the computer is one of a cluster of computers in the container orchestration environment (step 702). It should be noted that each respective step in the plurality of steps is comprised of two sub-steps, which include a prepare container environment sub-step and an execute task command sub-step. In addition, the computer generates an agent daemon, which is a default command for containers running the plurality of steps comprising the pipeline workload on the computer, to communicate with the pipeline workload manager (step 704). The computer inserts the agent daemon in each container running a respective step of the pipeline workload on the computer (step 706).

The computer, using the agent daemon of a particular container, communicates to the pipeline workload manager that the particular container has finished running a step of the pipeline workload (step 708). The computer, using the pipeline workload manager, checks the pipeline workload information corresponding to the pipeline workload registered in the workload information center to determine whether the particular container can be reused to run a particular step in a different pipeline workload (step 710). It should be noted that the particular step may be the same step that finished running or a different step. Also, the different pipeline workload may be on the computer or on a different computer in the cluster. The computer, using the pipeline workload manager, provides the particular container to be reused to run the particular step in the different pipeline workload without having to perform the prepare container environment sub-step of that particular step based on determining that the particular container can be reused to run that particular step in the different pipeline workload according to the pipeline workload information registered in the workload information center (step 712).

Further, the computer, using the pipeline workload manager, selects another step in the plurality of steps in the pipeline workload to form a selected step to run on a previously used container based on a set of predefined custom rules (step 714). It should be noted that the previously used container may be on the computer or received from another computer in the cluster. The computer, using the agent daemon of the previously used container, runs the selected step in the pipeline workload on the previously used container without performing the prepare container environment sub-step of the selected step to decrease runtime of the selected step and increase performance of the computer (step 716).

Subsequently, the computer makes a determination as to whether all of the plurality of steps in the pipeline workload have been run (step 718). If the computer determines that not all of the plurality of steps in the pipeline workload have been run, no output of step 718, then the process returns to step 708 where the computer, using the agent daemon of a particular container, communicates to the pipeline manager that the particular container has finished running a step in the pipeline workload. If the computer determines that all of the plurality of steps in the pipeline workload have been run, yes output of step 718, then the process terminates thereafter.

Figure 8:
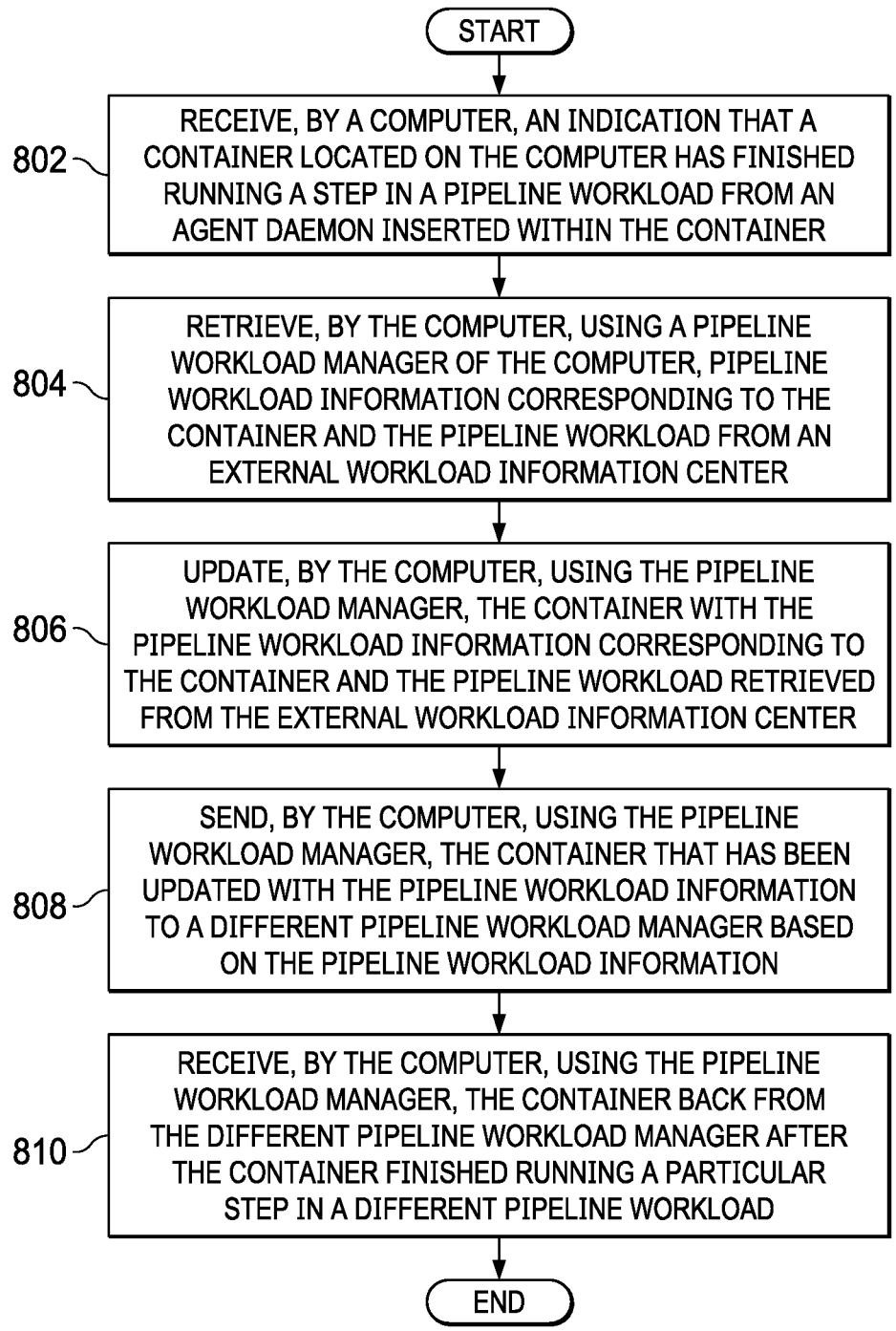
FIG. 8 is a flowchart illustrating a process for container sharing in accordance with an illustrative embodiment.

With reference now to FIG. 8, a flowchart illustrating a process for container sharing is shown in accordance with an illustrative embodiment. The process shown in FIG. 8 may be implemented in a computer, such as, for example, server 104 in FIG. 1 or data processing system 200 in FIG. 2.

The process begins when the computer receives an indication that a container located on the computer has finished running a step in a pipeline workload used for artificial intelligence processing from an agent daemon inserted within the container (step 802). In response to receiving the indication, the computer, using a pipeline workload manager of the computer, retrieves pipeline workload information corresponding to the container and the pipeline workload from an external workload information center, such as, for example, workload information center 308 in FIG. 3 (step 804).

The computer, using the pipeline workload manager, updates the container with the pipeline workload information corresponding to the container and the pipeline workload retrieved from the external workload information center (step 806). The computer, using the pipeline workload manager, sends the container that has been updated with the pipeline workload information to a different pipeline workload manager based on the pipeline workload information (step 808). It should be noted that the different pipeline workload manager may be located, for example, in another computer of a cluster of computers that includes the computer. Subsequently, the computer, using the pipeline workload manager, receives the container back from the different pipeline workload manager after the container finished running a particular step in a different pipeline workload (step 810). The particular step may be the same step or a different step and the different pipeline workload may be on the computer or another computer in the cluster.

Thus, illustrative embodiments of the present invention provide a computer-implemented method, computer system, and computer program product for optimizing resources for a pipeline workload comprised of a plurality of steps that is used for artificial intelligence processing on a cluster of host nodes in a container orchestration environment by reusing a container that finished running a step of the pipeline workload on a host node to run that same step in a different pipeline workload on a different host node. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reusing containers, the computer-implemented method comprising:

generating, by a computer, an agent daemon to communicate with a pipeline workload manager of the computer, wherein the agent daemon is a default command for containers running a plurality of steps comprising a pipeline workload;

inserting, by the computer, the agent daemon in each container running a respective step of the pipeline workload;

communicating, by the computer, using the agent daemon of a particular container, to the pipeline workload manager of the computer that the particular container has finished running a step of the pipeline workload;

checking, by the computer, using the pipeline workload manager, pipeline workload information corresponding to the pipeline workload to determine whether the particular container can be reused to run a particular step in a different pipeline workload; and providing, by the computer, using the pipeline workload manager, the particular container to be reused to run the particular step in the different pipeline workload without having to perform a prepare container environment sub-step of that particular step based on determining that the particular container can be reused to run that particular step in the different pipeline workload according to the pipeline workload information.

2. The computer-implemented method of claim 1 further comprising:
selecting, by the computer, using the pipeline workload manager, another step in the plurality of steps in the pipeline workload to form a selected step to run on a previously used container based on a set of rules; and
running, by the computer, using the agent daemon of the previously used container, the selected step in the pipeline workload on the previously used container without performing the prepare container environment sub-step of the selected step to decrease runtime of the selected step and increase performance of the computer.

3. The computer-implemented method of claim 1 further comprising:
registering, by the computer, using the pipeline workload manager, the pipeline workload information corresponding to the pipeline workload comprised of the plurality of steps running on the computer with a workload information center in a container orchestration environment, wherein the computer is one of a cluster of computers in the container orchestration environment, and wherein each respective step in the plurality of steps is comprised of two sub-steps that include the prepare container environment sub-step and an execute task command sub-step.

4. The computer-implemented method of claim 1 further comprising:
receiving, by the computer, an indication that the particular container has finished running the step in the pipeline workload from the agent daemon inserted within the particular container; and
retrieving, by the computer, using the pipeline workload manager, the pipeline workload information corresponding to the particular container and the pipeline workload from a workload information center.

5. The computer-implemented method of claim 1 further comprising:
updating, by the computer, using the pipeline workload manager, the particular container with the pipeline workload information corresponding to the particular container and the pipeline workload retrieved from a workload information center; and
sending, by the computer, using the pipeline workload manager, the particular container that has been updated with the pipeline workload information to a different pipeline workload manager.

6. The computer-implemented method of claim 1 further comprising:
receiving, by the computer, using the pipeline workload manager, the particular container back from a different pipeline workload manager after the particular container finished running the particular step in the different pipeline workload.

7. A computer system for reusing containers, the computer system comprising:
a bus system;
a storage device connected to the bus system, wherein the storage device stores program instructions; and
a processor connected to the bus system, wherein the processor executes the program instructions to:
generate an agent daemon to communicate with a pipeline workload manager of the computer system, wherein the agent daemon is a default command for containers running a plurality of steps comprising a pipeline workload;
insert the agent daemon in each container running a respective step of the pipeline workload;
communicate, using the agent daemon of a particular container, to the pipeline workload manager of the computer system that the particular container has finished running a step of the pipeline workload;
check, using the pipeline workload manager, pipeline workload information corresponding to the pipeline workload to determine whether the particular container can be reused to run a particular step in a different pipeline workload; and
provide, using the pipeline workload manager, the particular container to be reused to run the particular step in the different pipeline workload without having to perform a prepare container environment sub-step of that particular step based on determining that the particular container can be reused to run that particular step in the different pipeline workload according to the pipeline workload information.

8. The computer system of claim 7, wherein the processor further executes the program instructions to:
select, using the pipeline workload manager, another step in the plurality of steps in the pipeline workload to form a selected step to run on a previously used container based on a set of rules; and
run, using the agent daemon of the previously used container, the selected step in the pipeline workload on the previously used container without performing the prepare container environment sub-step of the selected step to decrease runtime of the selected step and increase performance of the computer system.

9. The computer system of claim 7, wherein the processor further executes the program instructions to:
register, using the pipeline workload manager, the pipeline workload information corresponding to the pipeline workload comprised of the plurality of steps running on the computer system with a workload information center in a container orchestration environment, wherein the computer system is one of a cluster of computers in the container orchestration environment, and wherein each respective step in the plurality of steps is comprised of two sub-steps that include the prepare container environment sub-step and an execute task command sub-step.

10. The computer system of claim 7, wherein the processor further executes the program instructions to:
receive an indication that the particular container has finished running the step in the pipeline workload from the agent daemon inserted within the particular container; and
retrieve, using the pipeline workload manager, the pipeline workload information corresponding to the particular container and the pipeline workload from a workload information center.

11. The computer system of claim 7, wherein the processor further executes the program instructions to:
update, using the pipeline workload manager, the particular container with the pipeline workload information corresponding to the particular container and the pipeline workload retrieved from a workload information center; and send, using the pipeline workload manager, the particular container that has been updated with the pipeline workload information to a different pipeline workload manager.

12. A computer program product for reusing containers, the computer program product comprising a computer-readable storage medium having program instructions embodied therewith, the program instructions executable by a computer to cause the computer to perform a method of:

generating, by the computer, an agent daemon to communicate with a pipeline workload manager of the computer, wherein the agent daemon is a default command for containers running a plurality of steps comprising a pipeline workload;

inserting, by the computer, the agent daemon in each container running a respective step of the pipeline workload;

communicating, by the computer, using the agent daemon of a particular container, to the pipeline workload manager of the computer that the particular container has finished running a step of the pipeline workload;

checking, by the computer, using the pipeline workload manager, pipeline workload information corresponding to the pipeline workload to determine whether the particular container can be reused to run a particular step in a different pipeline workload; and providing, by the computer, using the pipeline workload manager, the particular container to be reused to run the particular step in the different pipeline workload without having to perform a prepare container environment sub-step of that particular step based on determining that the particular container can be reused to run that particular step in the different pipeline workload according to the pipeline workload information.

13. The computer program product of claim 12 further comprising:

selecting, by the computer, using the pipeline workload manager, another step in the plurality of steps in the pipeline workload to form a selected step to run on a previously used container based on a set of rules; and running, by the computer, using the agent daemon of the previously used container, the selected step in the pipeline workload on the previously used container without performing the prepare container environment sub-step of the selected step to decrease runtime of the selected step and increase performance of the computer.

14. The computer program product of claim 12 further comprising:

registering, by the computer, using the pipeline workload manager, the pipeline workload information corresponding to the pipeline workload comprised of the plurality of steps running on the computer with a workload information center in a container orchestration environment, wherein the computer is one of a cluster of computers in the container orchestration environment, and wherein each respective step in the plurality of steps is comprised of two sub-steps that include the prepare container environment sub-step and an execute task command sub-step.

15. The computer program product of claim 12 further comprising:

receiving, by the computer, an indication that the particular container has finished running the step in the pipeline workload from the agent daemon inserted within the particular container; and retrieving, by the computer, using the pipeline workload manager, the pipeline workload information corresponding to the particular container and the pipeline workload from a workload information center.

16. The computer program product of claim 12 further comprising:

updating, by the computer, using the pipeline workload manager, the particular container with the pipeline workload information corresponding to the particular container and the pipeline workload retrieved from a workload information center; and sending, by the computer, using the pipeline workload manager, the particular container that has been updated with the pipeline workload information to a different pipeline workload manager.

17. The computer program product of claim 12 further comprising:

receiving, by the computer, using the pipeline workload manager, the particular container back from a different pipeline workload manager after the particular container finished running the particular step in the different pipeline workload.

* * * * *